(12) United States Patent
Edgar et al.

(10) Patent No.: US 10,333,881 B2
(45) Date of Patent: Jun. 25, 2019

(54) ADAPTIVE RANKING OF EMAILS IN NEWS FEEDS

(71) Applicant: Facebook, Inc., Menlo Park, CA (US)

(72) Inventors: Randall Kane Edgar, Oakland, CA (US); Vivin Antony Williams, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 223 days.

(21) Appl. No.: 14/935,038

(22) Filed: Nov. 6, 2015

(65) Prior Publication Data
US 2017/0134329 A1  May 11, 2017

(51) Int. Cl.
*H04L 12/58* (2006.01)
(52) U.S. Cl.
CPC .............. *H04L 51/26* (2013.01); *H04L 51/22* (2013.01)
(58) Field of Classification Search
None
See application file for complete search history.

(56) References Cited

U.S. PATENT DOCUMENTS

| | | | | |
|---|---|---|---|---|
| 2009/0070219 A1* | 3/2009 | D'Angelo | ............... | G06Q 10/10 705/14.56 |
| 2009/0070334 A1* | 3/2009 | Callahan | ............... | G06F 21/604 |
| 2013/0080266 A1* | 3/2013 | Molyneux | ............... | G06Q 10/00 705/14.72 |
| 2014/0181194 A1* | 6/2014 | Sullivan | ................. | H04L 67/22 709/204 |
| 2015/0278764 A1* | 10/2015 | Patil | ..................... | G06Q 10/103 705/301 |
| 2015/0381552 A1* | 12/2015 | Vijay | ..................... | H04L 51/32 709/206 |

* cited by examiner

*Primary Examiner* — Azizul Choudhury
(74) *Attorney, Agent, or Firm* — Fenwick & West LLP

(57) ABSTRACT

An online system receives user interactions associated with an organization. The system generates news feed stories for a user based on the received interactions, and receives emails for the user. The system ranks the emails based on a significance of the email for the user. The system selects for the user a plurality of feed items, wherein a feed item is either a news feed story or an email. The system ranks the plurality of feed items using a ranking score determined for each feed item. The system presents the plurality of feed items to a user based on their ranking in response to receiving a vertical scroll input from the user. If the system receives a horizontal scroll input from the user, the system selects a subset of the plurality of feed items and presents them to the user in response to subsequent horizontal scroll inputs.

22 Claims, 10 Drawing Sheets

ADAPTIVE RANKING OF EMAILS IN NEWS FEEDS

BACKGROUND

This invention relates to news feeds in online systems and in particular to using machine learning for ranking emails and presenting them as news feed of an online system.

In a work environment, many different systems are used to allow collaboration and communication between employees. These include email, an organizational intranet (e.g., a network service such as a web server accessible only via the local area network (LAN) of the organization), electronic bulletin boards, voice over Internet Protocol (IP), instant messaging tools, and so on. However, these systems are completely separate from each other in many cases. For example, a user may use an email software application on a client device connected to an email server to retrieve his or her email, and may then use a web browser application to access a company intranet located on a different server. Each system typically requires different ways of interacting with the system, access rights, passwords, and so on. This creates additional complexities for users of the systems.

Furthermore, although the means of collaboration between users have increased (e.g., instant messaging), most systems used in a workplace have not changed significantly in the manner in which information is presented to the user. For example, emails are still delivered and viewed in a similar fashion to real physical mail. A user receives in his or her "inbox" a listing of messages that have been addressed to that user, in a chronological, alphabetical, or other simple order. There is no indication to the user of which emails may be important. Instead, due to the design of the system, a user typically looks through his or her emails chronologically from the oldest unread to the most recent unread messages. Accordingly, using conventional systems, the user may fail to respond quickly to an important email, or the system may cause inefficiencies for the user as the user may process many unread emails that are not important (e.g., informational notices, newsletter emails, spam).

Some organizations use an online system (e.g., a social networking system) as a tool for facilitating collaboration between users. Such collaboration may be performed using groups, events, and other activities using the online system. Such online systems allow users to perform various actions including posting of comments, posting of status updates, transactions, "likes" of other content uploaded to the online system, and uploads of files such as presentations, images, and videos. The online system presents information describing various actions taken by other users to a user as news feed stories, also referred to herein as stories, the news feed, or feed stories. However, such an online system only provides information describing actions performed using the online system. Information describing actions performed outside the online system, such as those performed using an email system as described above, are not accessible to the online system. The user has to interact with each system separately to access information available in the system. Thus, conventional techniques for collaboration or communication within an organization are often cumbersome to use and inefficient for users.

SUMMARY

An online system of an organization ranks messages, such as emails received by a user and includes them in a feed along with news feed stories describing actions of other users of the organization for presentation to the user.

The online system ranks messages based on various factors including information related to the messages, organizational structure of employees of the organization, connections between users, the user profile attributes, past interactions of users, and other information regarding the user and the actions performed by the user within the online system. The online system trains a model using a training set of messages. The model uses features extracted from the messages and information related to the messages. The model ranks the messages based on a measure of importance or priority of each message for the user. Examples of features include the number of recipients of a message, the relationships between the recipients, past interactions of the user with messages, and so on.

The online system uses the trained model to rank messages received by a user. The online system extracts the above features from these messages using the information related to the messages, and produces a ranking score for each message. The ranking score for each message is used to rank the message in a combined feed including news feed stories. The news feed stories are based on various user actions and other events represented in the online system. Examples of a news feed story include information describing a group invite for an event such as a meeting, comments of other users with the meeting, interactions of users indicating whether they liked a comment, and so on. By ranking the messages by their importance, a user can access messages in order of their significance rather than in a chronological order, thereby improving efficiency. Furthermore, as the messages are shown alongside the news feed stories, the user may access more of their work-related information using one system, thereby further improving user efficiency. The online system further allows users to perform interactions with emails that are conventionally used for news feed stories, for example, liking an email, commenting on an email, recommending an email, and so on. This provides new types of interactions for the users of the online system and allows them to provide feedback for specific messages. The feedback received from users may be used by the model for ranking the messages.

In one embodiments, the online system also produces a combined feed display that allows users to perform a horizontal scroll input against a message. Typically the combined news feed display is presented to the user in a vertical scrolling interface, such that each combined feed item presented to the user can be viewed by scrolling the combined news feed display in a vertical direction. The online system selects, for a message in the combined feed, other messages related to that message based on one or more factors. The online system also orders those messages based on another factor. For example, the online system may select messages related by the same sender, and ordered chronologically. Once the user performs a horizontal scroll input against this first message, the online system can present the related messages in the particular ordering to the user. In this fashion, the user does not need to scroll down in order to see additional messages related to this first message.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a diagram of a system environment for presenting messages such as emails in a news feed to users of an online system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Email is fetched from an email system using application programming interfaces (APIs) for that email system. For example, Exchange-based mail may be fetched using a messaging application programming interface (MAPI.) The email is displayed using a news feed or ticker of an online system, along with other items that may appear on the news feed for anything work-related, such as instant messages, posts, etc. A ranking algorithm is used to rank/prioritize work related messages received by the user on the news feed. The ranking may be based on the significance of the email determined based on various factors including past interactions of the user with emails, interactions of connections of users with emails, interactions of colleagues (based on org chart) with emails, affinity between sender and the user, and so on.

System Environment

Figure 1:
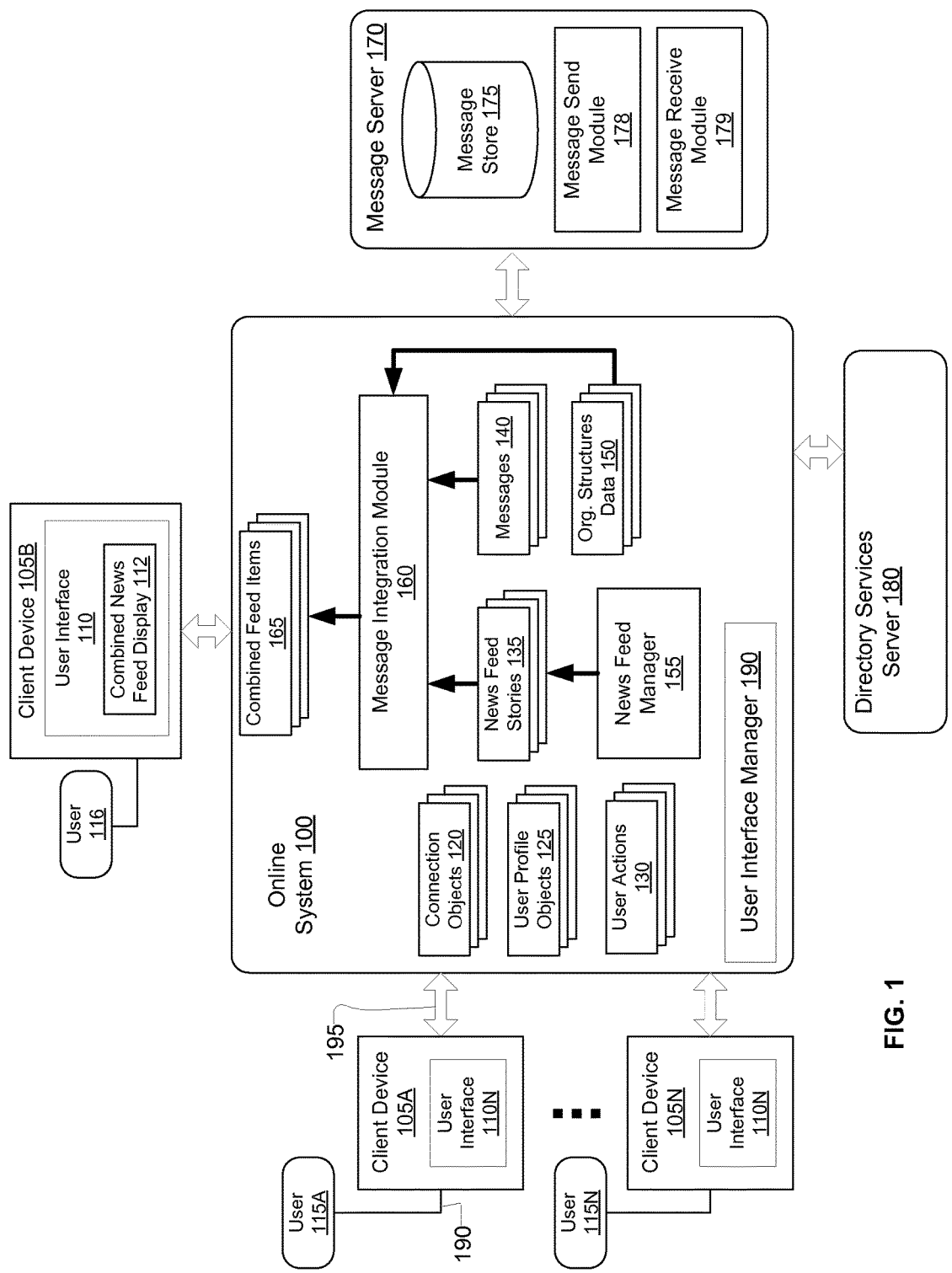

FIG. 1 is a diagram of a system environment for presenting messages such as emails in a news feed to users of an online system, in accordance with an embodiment of the invention. The users 115 interact with the online system 100 using client devices 105. The online system 100 is further coupled to a directory services server 180, the message server 170, and the client device 106 via a network (e.g., a VPN, the Internet). Some embodiments of the online system 100 and client devices 105 have different and/or other modules than the ones described herein, and the functions can be distributed among the modules in a different manner than described here.

The directory services server 180 stores directory information for an organization. The directory services server 180 stores the organizational structure of an associated organization, and is typically administered by that organization. The organizational structure includes information about the roles of each member of the organization (e.g., CEO, manager, supervisor, employee), and the relationships between these members (e.g., X is manager of Y). The directory services server 180 may support a standard directory services protocol, such as but not limited to Lightweight Directory Access Protocol (LDAP). A non-limiting example of a directory services server 180 is Microsoft Active Directory®.

The message server 170 stores, sends, and receives messages 140 that are sent from a user to one or more users. In one embodiment, messages 140 include emails. Each email, or electronic mail, comprises at least a message 140 header, and a message 140 body. The message 140 header includes control information, such as the sender's email address and the recipient address(es) (e.g., To, Cc (carbon copy), Bcc (blind carbon copy)). The message 140 header may also include a timestamp, network address of an originating message server, and so on. The message 140 body includes the content that a sender is sending to the recipient. The content may include plain text, formatted text, and/or attached files (via Multipurpose Internet Mail Extensions (MIME)). Emails may be sent and received by the message server 170 using a variety of standard protocols, such as Simple Mail Transfer Protocol (SMTP).

The message server 170 may also support a variety of protocols to allow email clients on users' client devices 105 to retrieve emails from the users' email account that are addressed to the user and to send emails to other users. These access protocols may include but are not limited to Internet Message Access Protocol (IMAP), Post Office Protocol 3 (POP3), and Messaging Application Programming Interface (MAPI). A non-limiting example of a message server is Microsoft Exchange®. The message server 170 may also support a web interface to allow users to use a web browser to connect to the message server 170 to access the emails addressed to that user in his or her email account.

The message server 170 includes a message store 175 that stores the messages 140 sent and received by users. The message store 175 may be a database, flat file, or other format. The message store 175 further indicates for each stored message 140 which user the message 140 is associated with. Each user may have his or her messages 140 categorized into various folders or with various labels (e.g., inbox, drafts, trash).

The message server 170 includes a message send module 178 and a message receive module 179 to send and receive messages 140 for users associated with the message server 170. When an external user (i.e., a user outside the organization) sends a message 140 to a user of the organization associated with the message server 170, the external user addresses the message 140 to the user using an address identifying the user of the organization (e.g., an email address). Using a domain name system lookup (e.g., a MX reference) based on the recipient's address, the external user's message server is able to address the message 140 to the message server 170 (or a gateway server that can access the message server 170). The message 140 is then received by the message receive module 179, which stores the message 140 in the message store 175 and associates it with a user having a recipient address that is the same as the address in the message 140. If no such user exists in the organization, then the message receive module 179 may respond to the sender's address with an error message 140.

The message send module 178 receives from a client device of a user a request to send a message 140 to a recipient's address. The message send module 178 determines the address of the destination message server and sends the message 140 to this address.

While the message server 170, online system 100, and the directory services server 180 are illustrated separately in FIG. 1, in some embodiments two or all of these elements may comprise a single entity combining the functions of these separate elements. In another embodiment, each element may be virtualized within a single computing device.

The online system 100 offers its users the ability to communicate and interact with other users of the online system 100. In an embodiment, the online system is a social networking system that allows users to add connections to a number of other users of the online system 100 to whom they desire to be connected. These other users connected to the user may be referred to herein as friends of the user. As used herein, the term "friend" refers to any other user to whom a user has formed a connection, association, or relationship via the online system 100. Each user may represent a person or entity, such as a business or organization. The term friend need not require that users actually be friends in real life, such as in the case where the user represents an entity; rather, it simply implies a connection in the online system 100.

The online system 100 maintains different types of object associated with users of the online system 100, for example, user profile objects 125, connection objects 120, user actions 130, messages 140, organizational structures 150, and objects representing news feed stories 135. An object may be stored for each instance of the associated user. A user profile object 125 stores information describing a user of the online system 100. A connection object 120 stores information describing relations between two users of the online system or in general any two entities represented in the online system 100. These objects are further described in detail herein.

Figure 2:
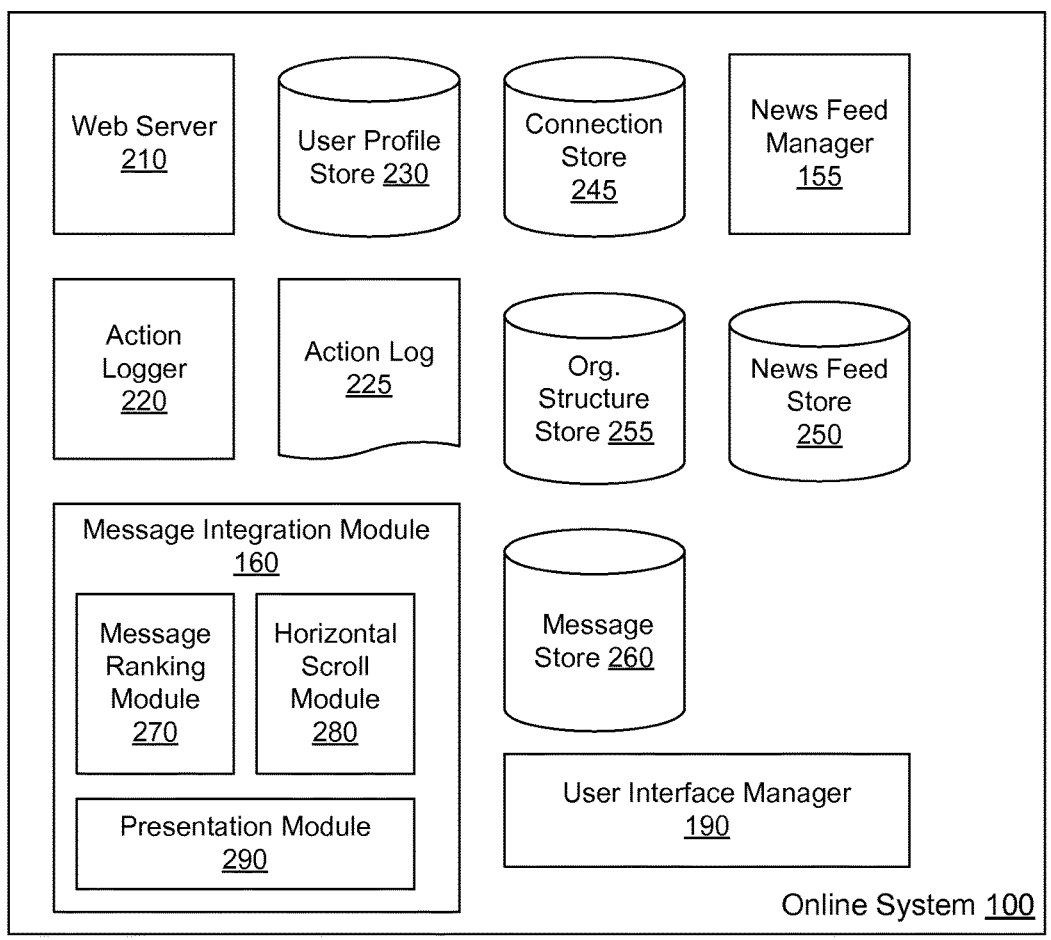
FIG. 2 is a diagram of system architecture of an online system for ranking news feed stories including emails presented to users, in accordance with an embodiment of the invention.

The online system 100 comprises a user interface manager 190 and various modules as described in FIG. 2. The news feed manager 155 generates the news feed stories 135. The user interface manager 190 allows users of the online system 100 to interact with the online system 100 via the user interface 110. The user interface manager 190 presents social information of interest to a user including news feed stories and messages 165. The news feed manager 155 ranks the news feed stories 135 of interest to each user 115 and presents them in order of the ranking.

The online system 100 also comprises a message integration module 160. In one embodiment, the message integration module 160 receives the news feed stories 135, messages 140, and information describing organizational structures 150, and generates combined feed items 165. The message integration module ranks each message 140 received from the message server 170 and ranks them using a ranking model. Each message 140 is placed within the combined feed items 165 according to the computed rank. Additional details regarding the generation of the combined feed items 165 will be described herein.

The client device 105 used by a user 115 for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 105 can be any device having computer functionality, such as a personal digital assistant (PDA), mobile telephone, smartphone, wearable device, etc.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

The client device 105 executes a user interface 110 to allow the user 115 to interact with the online system 100. The user interface 110 allows the user to perform various actions associated with the online system 100 and view information provided by the online system 100. The actions performed using the user interface 110 include adding connections, posting messages 140, uploading images or videos, updating the user's profile, and the like. The information provided by the online system 100 that can be viewed using the user interface 110 includes, images or videos posted by the user's connections, comments posted by the user's connections, messages 140 sent to the user by other users, or wall posts. In an embodiment, the user interface 110 is presented to the user via a browser application that allows a user to retrieve and present information from the internet or from a private network.

The client device 105B has a user interface 110 including a combined news feed display 112 that includes the items of the combined feed items 165 (i.e., news feed stories 135 and messages 140) as ranked by the message integration module 160. Instead of having to access the message server 170, the user 116 of the client device 105B may simply access the online system 100 to view his or her messages 140 via the combined news feed display 112. Additionally, since the messages 140 are ranked in order of a measure of significance of each message to the user, the user 116 is presented with those messages 140 that are likely to be of more significance or important to the user first in the combined news feed display 112. This is in contrast to accessing the message server 170 directly using a message server client, in which case the user 116 is presented with a simple ordered list (e.g., by timestamp, by sender, by the subject line) of messages 140 that would be unranked and which would be inefficient for the user to parse through as important and unimportant emails are equally dispersed throughout the unranked list.

The interactions between the client devices 105 and the online system 100 are typically performed via a network, for example, via the Internet. The network enables communications between the client device 105 and the online system 100. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

Online System Architecture

FIG. 2 is a diagram of system architecture of an online system 100 for ranking news feed stories presented to users, in accordance with an embodiment of the invention. The online system 100 includes a web server 210, the user interface manager 190, an action logger 220, an action log 225, a user profile store 230, a news feed manager 155, a connection store 245, a news feed store 250, an organizational structure store 255, a message store 260, and the message integration module 160, which includes a message ranking module 270, a horizontal scroll module 280, and a presentation module 290. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system.

The online system 100 allows users to communicate or otherwise interact with each other and access content. The online system 100 stores user profile objects 125 in the user profile store 230. The information stored in user profile store 230 describes the users of the online system 100, including biographic, demographic, and other types of descriptive information, such as age, work experience, educational history, interests, gender, sexual preferences, hobbies or preferences, location, income, languages spoken, ethnic background, and the like. Although the profile store 230 stores a wide range of descriptive information, the online system 100 may not use this information in all cases. In one embodiment, the profile store also stores information for a user related to the user's activities in the organization. For example, the profile store 230 stores information about a user's supervisor, the length of time the user has been at the organization, which projects the user is participating in, etc. Information describing a user may be explicitly provided by a user or may be inferred from actions of the user. For example, interests of a user can be inferred from the type of content accessed by the user. The user profile store 230 may store other types of information provided by the user, for example, images, videos, documents, likes indicated by the user, comments, status updates, recommendations of images, videos, or uniform resource locator (URL) links, and the likes. Images of users may be tagged with the identification information of the appropriate users displayed in an image.

The connection store 245 stores data describing the connections between different users of the online system 100, for example, as represented in a connection object 120. In embodiments that include a connection store, the online system is a social networking system. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the online system 100 based on common characteristics of the users (e.g., users who are alumni of the same educational institution). Connections in online system 100 are usually in both directions, but need not be, so the terms "connection" and "friend" depend on the frame of reference. For example, if Bob and Joe are both connected to each other in the online system 100, Bob and Joe, both users, are also each other's friends. The connection between users may be a direct connection; however, some embodiments of an online system 100 allow the connection to be indirect via one or more levels of connections. Connections may also be established between different types of entities for example, the online system 100 can have an object representing a school and users of the online system 100 that study in the school or who are alumni of the school can connect with the school in the online system 100.

The web server 210 links the online system 100 via a network to one or more client devices 105; the web server 210 serves web pages, as well as other web-related content, such as Flash, XML, and so forth. The web server 210 provides the functionality of receiving and routing messages between the online system 100 and the client devices 105 as well as other external systems. These messages can be instant messages, queued messages (e.g., email), text and SMS (short message service) messages, or any other suitable message type. In some embodiments, a message sent by a user to another can be viewed by other users of the online system 100, for example, by the connections of the user receiving the message. An example of a type of message that can be viewed by other users of the online system 100 besides the recipient of the message is a wall post.

The action logger 220 is capable of receiving communications from the web server 210 about user actions 130 within and/or external to the online system 100. The action logger 220 populates the action log 225 with information about user actions 130 to track them. When a user performs an action 130 using the online system 100, action logger 220 adds an entry for that action 130 to the action log 225. Any action 130 that a particular user takes with respect to another user is associated with each user's profile, through information maintained in a database or other data repository, such as the action log 225. Such actions 130 may include, for example, adding a connection to the other user, sending a message 140 to the other user, reading a message 140 from the other user, viewing content associated with the other user, attending an event posted by another user, posting a comment, "liking" a content item, among others. In addition, a number of actions described below in connection with other objects are directed at particular users, so these actions are associated with those users as well.

The news feed manager 155 provides the functionality for managing activities related to news feeds including generating the news feed stories, selecting the news feed stories for presentation to users of the online system 100, and ranking the news feed stories identified for presentation to a user.

The news feed manager 155 generates news feed stories for presentation to users of the online system 100. In an embodiment, the news feed manager 155 analyzes information stored in the action log 225 to identify information useful for generating news feed stories. The news feed manager 155 identifies actions stored in action log 225 that are likely to be of interest to viewers and extracts information describing these actions from the action log 225 to generate news feed stories 135. The news feed manager 155 determines that an action is likely to be of interest to a user based on various factors. For example, the news feed manager 155 may determine that actions performed by connections of the user are likely to be of interest to the user. Similarly, the news feed manager 155 may determine that actions representing interactions of users with objects associated with the user are likely to be of interest to the user, for example, other users commenting on or liking an image of the user or any content provided to the inline system 100 by the user, content describing the user, or content with which the user interacted in the past. The news feed manager 155 can obtain information describing actions from other modules, for example, from the action logger 220, the user interface manager 190, or other run time modules that implement functionality for performing different types of actions. For example, if a user uploads an image to the social networking system 100, the module executing the code for uploading the image can inform the news feed manager 155 of the action thereby causing the news feed manager 155 to generate a news feed story describing the action.

The news feed manager 155 may determine that certain actions are not likely to be of interest to users for reporting as news feed stories 135. For example, a user hiding a comment posted by another user or a user changing certain types of user preferences may not be of interest to other users and may therefore not be reported in news feed stories. However, other changes made by a user to the user's profile may be considered interesting for other users, for example, a change in relationship status of a user. The news feed manager 155 may determine that certain actions are not of interest to a user if the user does not frequently perform such an action relative to other actions.

The news feed manager 155 may not generate news feed stories based on certain actions as a matter of policies enforced by the online system 100. These policies may be created to ensure the privacy of users of the online system 100. For example, a user viewing user profile of another user or a user sending a private message 140 to another user may not be presented as news feed stories due to privacy concerns. Furthermore, the news feed manager 155 may consider privacy settings of individual users to determine whether certain actions of a user can be presented as news feed stories to other users. A user may set the user's privacy settings to limit the set of people to whom news feed stories describing the user's actions may be sent. For example, a user may allow only connections of the user to receive information describing the users' actions, whereas another user may allow connections of the user's connections to receive the information. A user may restrict the types of actions that are reported as news feed stories. For example, the user may specify that certain actions, for example, adding a new connection may not be reported as news feed stories.

In an embodiment, the news feed manager 155 stores the news feed stories 135 generated in the news feed store 250. The news feed store 250 may be represented as a database that links various objects related to the news feed stories 135. Each news feed story 135 stored in the news feed store 250 can be associated with other entities in the online system 100. In one embodiment, a news feed story 135 is associated with the entity that performed an action that is indicated in the news feed story 135. For example, a news feed story 135 may be associated with one or more users that performed an action described in the news feed story 135 as well as with a representation of the video in the online system 100.

In an embodiment, the news feed manager 155 uses machine learning techniques to generate a message ranking model for ranking news feed stories 135. Using the model, the news feed manager 155 generates a ranking score associated with a given news feed story 135. The news feed manager 155 can then order a set of news feed stories based on their ranking scores.

An example of a model is a classifier that takes as input a pair of news feed stories including a first news feed story and a second news feed story identified for presentation to a given user and returns true if the first news feed story ranks higher than the second news feed story for reporting to the user and false otherwise. The news feed manager 155 can use the output of the generated classifier to rank a given set of news feed stories by doing pair wise comparisons of the ranking scores of the stories. Other embodiments use other machine learning techniques for ranking news feed stories, for example, tree-based models, kernel methods, neural networks, splines, or an ensemble of one or more of these techniques.

The input into the message ranking model (or the news feed ranking model) include various features describing the users of the online system 100 and features describing the news feed stories. These features characterize the users and the news feed stories respectively. The features may be extracted from interactions of the users with the news feed story 135. For example, a news feed story 135 may be derived from a content item uploaded to the online system 100 by a user. The interactions with this content item may include the interactions described above, such as commenting, recommending, or liking the content item. Additional details regarding the news feed are described in U.S. patent application Ser. No. 13/194,770, filed Jun. 1, 2014, and issued as U.S. Pat. No. 8,768,863, which is hereby incorporated by reference in its entirety.

The organizational structure store 255 stores information regarding the organizational structure of an organization associated with the online system. The organizational structure may be received from the directory services server 180 of the organization or may be provided by a user, for example, by uploading a file representing the organizational structure. The organizational structure describes the relationships between members, roles, titles, names, group memberships, and other information regarding the organization. For example, the organizational structure may describe an employee of a company and his or her subordinates and/or supervisors, if any.

The message store 260 stores the messages 140 retrieved, or received, from the message server 170. The online system 100 may retrieve the messages 140 from the message server 170 using standard protocols (e.g., IMAP, POP3, MAPI) or via direct access to the message store 175 on the message server 170. Each message stored in the message store 260 may be associated with identifying information, such as the user or users sending or receiving the message 140. Each message 140 may also be associated with metadata, including a label or folder of the message 140, timestamp, sender and recipient information, and so on.

The message integration module 160, as described above, combines the news feed stories 135 generated by news feed manager 155 and messages 140 in the message store 260 to create the combined feed items 165 that includes a ranked list of the news feed stories 135 and the messages 140. The message integration module 160 may also select one or more related messages 140 for display in a horizontal scroll interface.

The message integration module 160 includes a message ranking module 270 to rank the messages 140 of a user with a ranking score using data from the organizational structure store 255, the connection store 245, the user profile store 230, and/or the action log 225. The message ranking module 270 trains a model based on an input set of data comprising features extracted from training data, which includes a set of messages 140 received by a user, along with organizational structures data 150, connection objects 120, user profile objects 125, and user actions 130, related to these messages 140. For example, a set of features extracted from a message 140 may include the relationships between the senders and recipients indicated in the message 140 using the organizational structures data 150, a measure of affinity between the senders and recipients, a rate of past interactions between the senders and recipients, and so on.

The training data further includes an output or answer set of data indicating a desired ranking of the training data messages 140. The desired ranking may be determined using domain experts, binary classification of the messages 140 from users, and/or an analysis of a user's interactions with the messages 140.

Once the message ranking model is trained (and validated), the message ranking module 270 uses the model to rank (non-training) any given set of messages 140 received by a user. The message ranking module 270 extracts the same features from any input message 140 data set as the training set. These features are then fed into the message ranking model to determine a ranking score of each message 140. In an embodiment, the message ranking model is configured to rank a set of combined feed items 165 including messages and news feed items. In these embodiments, the message ranking model is trained using a training set of combined feed items 165. In other embodiments, the message ranking model ranks the messages and the news feed manager 155 ranks the news feed items, and the message integration module 160 merges the two ranked lists to generate a combined feed.

In some embodiments, the message integration module 160 includes a horizontal scroll module 280 that selects related messages 140 of a user in the message store 260 to display in a horizontal scroll interface of the combined news feed display 112. Typically the combined news feed display 112 is presented to the user in a vertical scrolling interface, such that each combined feed item 165 presented to the user can be viewed by scrolling the combined news feed display 112 in a vertical direction. However, this means that the horizontal scrolling direction is not utilized. Thus, the horizontal scroll module 280 is configured to find a set of related messages 140 for presenting using a horizontal scroll interface. The horizontal scroll module 280 selects a subset of messages (or news feed items) from the set of the combined feed items 165 identified for presentation to the user based on factors such as the content of the messages 140, the sender and/or recipients of the messages 140, and so on. The horizontal scroll module 280 also determines an order of the messages 140 for the horizontal scroll. This allows related messages 140 to be grouped together, so that a user may be able to more easily find these messages 140, rather than potentially scrolling through the entire combined news feed display 112.

The presentation module 290 arranges the messages 140 and news feed stories 135 according to their rank into the combined feed items 165. The presentation module 290 also arranges the related messages 140 as determined by the horizontal scroll module 280. Once a message 140 is ranked by the message ranking module 270, the presentation module 290 determines the ranking of that message 140 relative to the news feed stories 135. In one embodiment, the presentation module 290 normalizes the ranking scores of the news feed stories 135 and the ranked messages 140 and orders them according to their normalized ranking. For example, the presentation module 290 may normalize the ranking scores of news feed stories and messages 140 to a scale of 0-100 (or some other scale), and the news feed stories and messages 140 are placed in a rank of ascending order according to their normalized ranking scores.

In one embodiment, the presentation module 290 also arranges the related messages 140 as determined by the horizontal scroll module 280. If the user performs a horizontal scroll interaction with a selected combined feed item 165 from the set of combined feed items 165 identified for presentation to the user (for example, a message 140), the presentation module 290 presents a subset of combined feed items 165 that are related to the selected combined feed item 165, as determined by the horizontal scroll module 280, and presents these combined feed items 165 in a particular order as determined by the horizontal scroll module 280.

Once the presentation module 290 arranges the combined feed items 165, the user interface manager 190 presents the combined feed to the user 116 as a combined news feed display 112. The user is able to view his or her messages 140 (e.g., emails), as well as important news feed stories 135 in one location, instead of having to view this content using multiple applications and via multiple locations. Furthermore, each combined feed item 165 in the combined news feed display 112 is ranked according to a ranking score. The ranking score is based on a measure of an estimate of significance of the combined feed items 165 for the user indicating which combined feed items 165 are most important or most interesting to the user. This allows the user to efficiently process the user's messages 140. Furthermore, in the case where a user performs a horizontal scroll operation on a selected message 140 (or combined feed item 165), the online system 100 is further presents to the user, other messages related to the selected message 140 so that the user may at his or her discretion view additional details and context for the selected message 140, once again increasing efficiency. This is in contrast to a traditional system, where a user must scroll through many messages 140 in order to find those that are of importance or which may be related to each other, or the user is required to re-sort the messages based on a new criteria such as the sender of the messages, causing the user to lose the original sorted order of the messages.

Additional details regarding the message integration module 160 are described herein. In particular, additional details regarding the message ranking module 270 are described with reference to FIGS. 3-7, and additional details regarding the horizontal scroll module 280 are described with reference to FIGS. 8-10.

In some embodiments, the system 100 is not an online system but a system that communicates with an online system to obtain the necessary user information. The system 100 may communicate with the online system, for example, using APIs provided by the online system. In these embodiments, some modules shown in FIGS. 3 and 8 may run in the system 100, whereas other modules may run in the remote online system. For example, the modules including the news feed presentation module 360 may run in the system 100 but modules user profile store 250, connection store 230, and action log 225 may exist in a separate online system.

Exemplary Message Ranking Module

Figure 3:
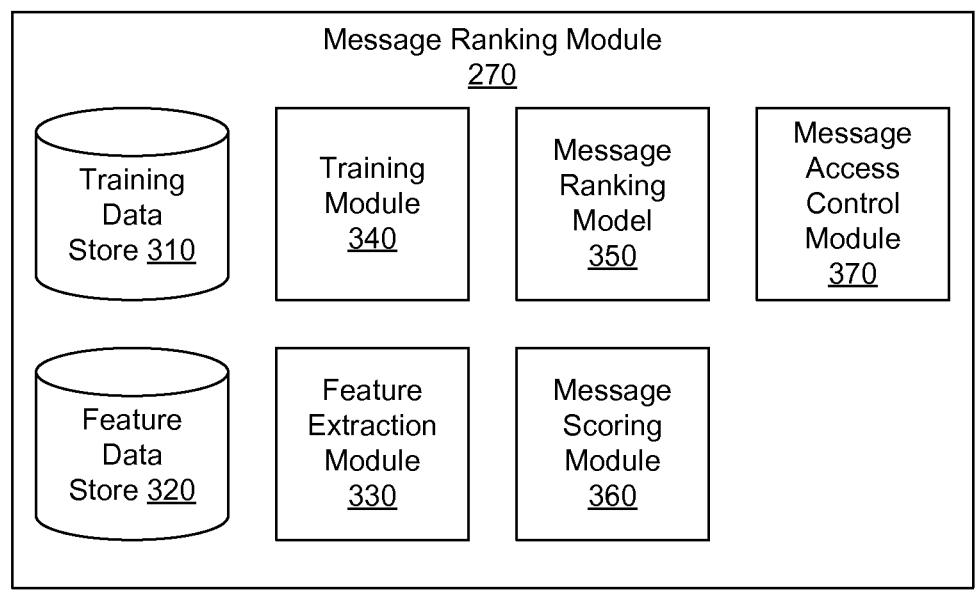
FIG. 3 is a block diagram illustrating an exemplary message ranking module of the system architecture diagram of FIG. 2.

FIG. 3 is a block diagram illustrating an exemplary message ranking module 270 of FIG. 2. The message ranking module 270 of FIG. 3 includes a training data store 310, a feature data store 320, a training module 340, a feature extraction module 330, a message ranking model 350, a message scoring module 360, and a message access control module 370. In other embodiments, the message ranking module 270 may include additional, fewer, or different modules for various applications. Conventional components such as network interfaces, security mechanisms, load balancers, failover servers, management and network operations consoles, and the like are not shown so as to not obscure the details of the system.

The training data store 310 stores training data sets for training of the message ranking model 350. The training data set includes training input data and expected output data. The training input data includes a training set of messages and feature data associated with these messages. The training set of messages are messages 140 that have been preselected and ranked. In other words, the output of the message ranking model for the training set of messages is known a priori.

As described in further detail below, the feature data is generated by the feature extraction module 330 by transforming raw input data. Raw input data may include information regarding messages 140 and additional information such as the organizational structure, connection data, user action data, user profile data, news feed stories, and so on. Compared to the raw input data, the feature data may be more informative, not redundant, and more optimally facilitates the training of the message ranking model 350. Additionally, the feature data is in a format that can be accepted by the message ranking model 350.

The output data includes the desired output (i.e., ground truth) of the message ranking model 350 based on the input data. For example, if a model is expected to output a certain score (e.g., a ranking score) based on a set of inputs, the score would be the output data. Output data may also be known as an answer vector. Each output data is thus necessarily associated with an input data, such as a set of features. As described in further detail below, the message ranking model 350 is trained by the training module 340 such that the model can be fitted to the input and output data. Once fitted, the training module 340 uses the message ranking model 350 to provide a ranking score for messages 140 that are not part of the training set and which do not have a pre-determined output data.

In one embodiment, the training data store 310 also includes data sets other than those discussed above, such as a verification data set. The verification data set also includes input and output data. The trained message ranking model 350 may be fed the input data of the verification data set to see if it is able to generate output that matches or has a threshold measure of similarity to the output data of the verification data. This may be used to ensure that the model has not been over fitted to the training data.

The feature extraction module 330 transforms raw input data into feature data that may be used as input to the message ranking model 350. As described above, the raw input data may include the messages 140 themselves and additional information such as the organizational structure, connection data, user action data, user profile data, news feed stories. The feature extraction module 330 takes each message 140 received by a user, and using the additional information and other messages 140, generates one or more items of feature data for that message 140 for the user. This feature data is represented in a format that can be processed by the message ranking model 350. In general, the number and types of feature data generated by the feature extraction module 330 are standardized for each message 140. This allows the message ranking model 350 to receive a consistent set of feature data for each message 140.

In addition to transforming the raw input data into a standardized set of feature data, the feature extraction module 330 also generates feature data that is informative upon the desired type of information that the model should produce.

In the case of message scoring, the desired type of output information from the model is a ranking score that indicates the significance or importance of a message 140 to a particular user. In such a case, the feature extraction module 330 generates features based on signals that are correlated with the message 140 significance and avoids signals that may be considered noise because they are less correlated with or less indicative of the message significance. For example, the feature extraction module 330 determines that a feature based on the number of recipients in a message 140 is relevant for determining message significance, while a feature based on the destination network address of the message is less relevant. The feature extraction module 330 may exclude such features determined to be less relevant or less correlated with the significance of the message for the user.

In one embodiment, the feature extraction module 330 generates a feature based on the recipients indicated in a message 140. The feature extraction module 330 may determine as a feature the number of recipients directly addressed by the message 140 (e.g., in a "To" section) or indirectly addressed (e.g., in a "Cc" section) by the message 140. The feature extraction module 330 may determine a feature indicating whether the user was addressed directly or indirectly (e.g., via the "To" or "Cc" fields). The feature extraction module 330 may also determine as a feature the ordinal position at which the user is listed in the recipient list. For example, if the user is indicated as the first person in the list of "To" recipients, the feature may indicate that the user was a first recipient.

In one embodiment, the feature extraction module 330 generates a feature based on the timestamp of the message 140. The feature extraction module 330 may determine a feature indicating how recently the message 140 was received, or how recently the message 140 was replied to by the user or by the sender or a recipient of the message 140.

In one embodiment, the feature extraction module 330 generates a feature for the message 140 based on interactions of the user with similar messages 140. The feature extraction module 330 first determines a set of similar messages 140 from the message store 260. The feature extraction module 330 may determine that a first message 140 is similar to a second message 140 when the messages 140 are from the same sender, to the same recipients, have the same or similar subject lines, have similar timestamps (within a certain range), are sent at the same time during a day, are of similar length, have similar content (e.g., by using a edit distance algorithm to determine similarity), and/or have similar attached files.

Using these similar messages 140, the feature extraction module 330 determines a feature based on the interactions of the user with these similar messages 140. Interactions may include replying to a message 140, liking a message 140, commenting on a message 140, marking the message 140 with a label or indicator, moving the message 140 to a different folder, or performing any other action 130 with the message 140 that is logged by the action log 225. The feature may be a value derived from a weighted combination of these interactions. Each interaction may also form its own feature (e.g., the number of replies to a message 140 may form one feature, and the number of comments may form a different feature).

In one embodiment, the feature extraction module 330 generates a feature for the message 140 based on the affinity of the user with the users identified in the message 140, such as the sender and/or recipients of the message 140. The feature extraction module 330 may determine the affinity of the user with a second user identified in the message 140 based on the frequency and number of interactions (as described above) that the user makes with other messages 140 that have the same second user. The feature extraction module 330 may determine an affinity score proportional to the number and frequency of the interactions (e.g., a higher score for a higher number of interactions).

In one embodiment, the feature extraction module 330 generates a feature for the message 140 based on the relationship of the user with the other users indicated in the message 140, according to the organizational structure data that may be retrieved from the organizational structure store 255. The feature extraction module 330 may determine as a feature the type of relationship between the sender of the message 140 and the user (e.g., manager, employee, supervisor). The feature extraction module 330 may also determine as a feature an organizational distance between the user and the sender and/or recipients of the message 140. The organizational distance between two users is the shortest number of connections needed to reach the second user from the first user, based on the organizational structure. For example, the organizational distance between a manager and a direct subordinate of that manager is one, as a direct connection exists between the two. The organizational distance between that subordinate and the manager's supervisor would be two, as two connections (i.e., subordinate to manager, and manager to supervisor) exist between the two.

In one embodiment, the feature extraction module 330 generates a feature for the message 140 based on the topic of the message 140. The feature extraction module 330 performs a topic analysis of the message 140 by analyzing keywords within the message 140 to determine one or more candidate topics.

In one embodiment, to determine the topic(s) of the message 140, the feature extraction module 330 identifies an anchor term in the message 140 using a dictionary. The feature extraction module 330 identifies candidate topics related to the anchor term in the dictionary by performing a keyword search of the dictionary. The feature extraction module 330 determines a context of the message 140 based on the user profile of the user and/or other users in the online system 100 that have messages 140 with the same anchor terms. Scores for these candidate topics are determined by the feature extraction module 330 based on other terms in the message 140, as well as the determined context of the message 140. The feature extraction module 330 selects the highest scored candidate topic or a certain number of high scoring topics as a feature. Additional details regarding topic analysis are described in U.S. patent application Ser. No. 13/167,701, filed Jun. 24, 2011, which is hereby incorporated by reference in its entirety.

In one embodiment, the feature extraction module 330 generates a feature for the message 140 based on the content of the message 140. The feature extraction module 330 analyzes the subject line, the body, and/or information describing any attachments of the message 140 (for example, content of the attachments, file extensions of the attachments, size of the attachments, and so on) and a similarity between the message 140 and other messages 140 that the user has received. The similarity may be based on the keywords, length, size, and attachment type. The similarity may also be based on an analysis by an edit distance algorithm. Messages that are similar to other messages 140 that the user has frequently interacted with may receive a higher measure of similarity. The feature extraction module 330 may base the feature on this measure of similarity.

In one embodiment, the feature extraction module 330 generates a feature for the message 140 based on the sentiment of the message 140. The feature extraction module 330 determines the sentiment of the message 140 based on the content of the message 140. In one embodiment, the feature extraction module 330 determines the sentiment based on the types of interaction of the user with the message 140 and messages 140 that are similar to that message 140. Certain types of interaction may be used by the feature extraction module 330 to determine positive or negative sentiment. For example, the feature extraction module 330 determines that a user interaction indicating the user likes a message (a "like" operation) indicates a positive sentiment. On the other hand, the feature extraction module 330 determines that a user deleting a message or moving the message to a trash folder (or to a folder with large number of messages that have been unread for a long period of time) without accessing the full message indicates a negative sentiment. A user may delete a message or move the message to a folder without accessing the full content of the message by selecting a plurality of messages and performing the respective action. As another example, an analysis of the keywords of a comment in response to a message 140 may indicate a negative sentiment. Additional details regarding sentiment analysis are described in U.S. application Ser. No. 14/023,136, filed Sep. 10, 2013, which is hereby incorporated by reference in its entirety.

The feature data store 320 stores feature data generated by the feature extraction module 330 for non-training messages 140. As described above, features are data that influence the desired type of information that the model should produce. In other words, the selection of certain data can improve the accuracy of the model, whereas other data may not help to improve the accuracy of the model, and may even decrease the accuracy. The feature data is data that may help to improve the accuracy of the model. As an example, when ranking messages to determine the important of the messages to a user, data related to the content of the messages is used as feature data, whereas data related to the message server operating system is not used as feature data as it is not informative upon the importance of the message to the user. The data stored in the feature data store 310 is fed to the message ranking model in order to produce a ranking score for each message 140.

The training module 340 trains the message ranking model 350 using the feature data generated from input data, output data, and/or other data sets by the feature extraction module 330 and stored in the training data store 310. In one embodiment, the training module 340 feeds the feature data for each message 140 into the message ranking module 350 along with the desired output data to train the message ranking module 350 using machine learning training techniques, such as supervised learning. Examples of training techniques include support vector machines, neural networks, Bayes classifiers, linear regression, decision trees, and so on. In one embodiment, the message ranking model 350 provides a coefficient to each type of feature that may occur for a message 140. These features may include those described above and others. Each feature is assigned a value or converted into a value and modified by the coefficient. The resulting values are combined together (e.g., by a weighted aggregation or summation) resulting in a final ranking score. Using a training technique, the coefficients of these features are modified across the entire feature data input set and so that the output ranking score for each message 140 in the training set fits the output data of the training set. Initially, a default coefficient may be applied to each feature.

Once the model is trained by the training module 340, the training module 340 may further verify the accuracy of the model using a separate verification data set that includes both feature data and output data.

In one embodiment, the training module 340 further trains the message ranking model 350 for each user based on the user response to messages 140 that are presented to the user. Messages that are more frequently interacted with may receive a higher score relative to messages 140 that are less frequently interacted with. These scores are fed back into the message ranking model 350 and the message ranking module 350 is further trained by the training module 340 using this information.

The message ranking model 350 is the model that receives information such as feature data that are related to a message 140 as input and outputs a ranking score for that message 140. As described above, the message ranking model 350 is trained using the training module 340 using various extracted features. Once the message ranking model 350 is trained, the message scoring module 360 uses the message ranking model 350 to compute a ranking score for each message 140 received for the user.

The message scoring module 360 computes a ranking score for each message 140 using the message ranking module 350. After receiving a message 140 for the user, the message scoring module 360 submits the message 140 to the feature extraction module 330 to extract the features for the message 140 using the additional information related to each message 140 (e.g., user actions, connection information, organizational structure). These features are stored in the feature data store 310. The message scoring module 360 then inputs these features into the message ranking model 350 to generate a ranking score as described above. This score is associated with the message 140 and passed to the presentation module 290 to be ranked alongside other messages 140 and news feed stories 135.

In one embodiment, the message access control module 370 determines the access control rights for each message 140. As each message 140 is sent to a specific user and only has a certain subset of the users of the organization listed as recipients of the message 140, only certain users are presented with the message 140 and have the ability to edit and/or see the message 140. The message access control module 370 analyzes the users indicated in the message 140 to determine the list of users who may have rights to access and/or respond to a message 140.

The message access control module 370 determines that the users of the organization corresponding to the recipients (e.g., the "To" and "Cc" recipients) of the message 140 can access and perform actions against the message 140. Actions may include commenting on the message 140, liking the message 140, sharing the message 140 with others, and other actions as described above.

In one embodiment, the message access control module 370 also determines that other users indicated in the message body and who are part of the organization should have a level of access to the message 140, although this level of access is less than the level of access given to the recipients. For example, the message access control module 370 may search through the body of the message 140 for the names of other users, and determines that these users have read access to the messages 140. The message access control module 370 may provide this access only upon configuration by the user or upon determining that the sentiment of the message 140 is positive, as some users may be referenced in the message 140 but are not identified as a recipient of the message 140. The message access control module 370 may allow the users explicitly identified as the sender and recipients of the message to be allowed to perform all possible operations with respect to the message. In contrast, the message access control module 370 may allow other users such as remaining users of the organization to perform limited set of interactions including liking, commenting on messages, but not replying to the message. This allows a larger audience to review the message thread, like messages, comment on the messages, although the messages are only exchanged between a restricted set of users, for example, a set of users identified as experts in the organization. Accordingly, the system allows users to provide limited feedback to messages in an email interaction between a set of experts as the interaction proceeds.

In one embodiment, the message access control module 370 determines that those users listed in the recipient list of an email only have a limited level of access when the recipient list indicates a group list instead of an individual user. For example, a message 140 may be addressed to "All Employees," in which case the message access control module 370 limits the actions that may be performed by a recipient user to read only (i.e., no replies), and/or to be able to perform an action against the message 140 that only the sender of the message 140 may view.

In one embodiment, the message access control module 370 receives additional access control requests from a user after the message 140 has been presented to the user. The access control request may be to share the message 140 with additional users. If this is the case, then the message access control module 370 assigns these additional users rights to be presented with the message 140. The access control request may also be to hide the message 140 from these additional users who have been previously assigned access rights to be presented with the message 140. If this is the case, the message access control module 370 removes the rights of these users to be presented with the message 140.

Exemplary Flow for Generating and Using a Message Ranking Model

Figure 4:
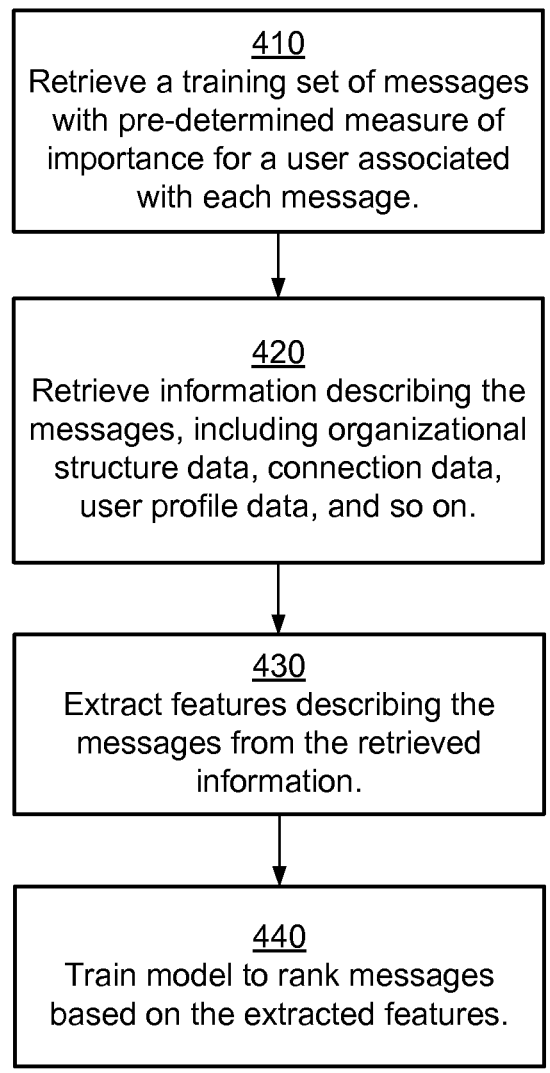
FIG. 4 shows a flowchart illustrating a method of training the message ranking model by the online system according to an embodiment of the invention.

FIG. 4 shows a flowchart illustrating a method of training the message ranking model 350 by the online system 100 according to an embodiment of the invention. To train the message ranking module, the online system 100 initially retrieves 410 a training set of messages 140 comprising messages 140 received by a user. In one embodiment, these messages 140 are email messages 140. In other embodiments, these messages 140 may be any other type of message 140 sent from a sender to one or more recipients. This training set of messages 140 may be stored in the training data store 310. In one embodiment, the retrieval of the training set of messages 140 is performed by the training module 340. These messages 140 furthermore are associated with a predefined measure of importance or significance for a user associated with each message as described above. The measure of significance may be specified as a ranking score. The ranking score may be determined using a binary classification by one or more users. For example, a user may be shown two emails from his or her inbox, and asked to select the more important message 140 (i.e., the message 140 that the user would like to see ranked higher in a list of messages). After classifying all the messages 140 in the training set, ranking of the messages 140 in the training set can be generated.

After retrieving the messages 140, the online system 100 also retrieves 420 the information describing the messages 140, such as the organizational structures data 150, user actions 130, user profile objects 125, connection objects 120, and so on. For example, user actions may include instances where a user responded to, commented on, liked, or performed any other action regarding a message 140. Subsequently, the online system extracts 430 the features describing the messages 140 from the retrieved information. This feature extraction is performed by the feature extraction module 330 in the manner described above.

After extracting the features for the messages 140 from the information describing the messages 140 (and the message itself), the online system 100 trains 440 the message ranking model 350 using the extracted feature data and the ranking information for the training set of messages 140. As described above, using machine learning techniques, the message ranking module 350 is trained to fit the feature data (the input data) and the ranking data (the output data).

After training, the online system 100 can begin to use the message ranking model 350 to rank subsequent messages 140 received by the user.

Figure 5:
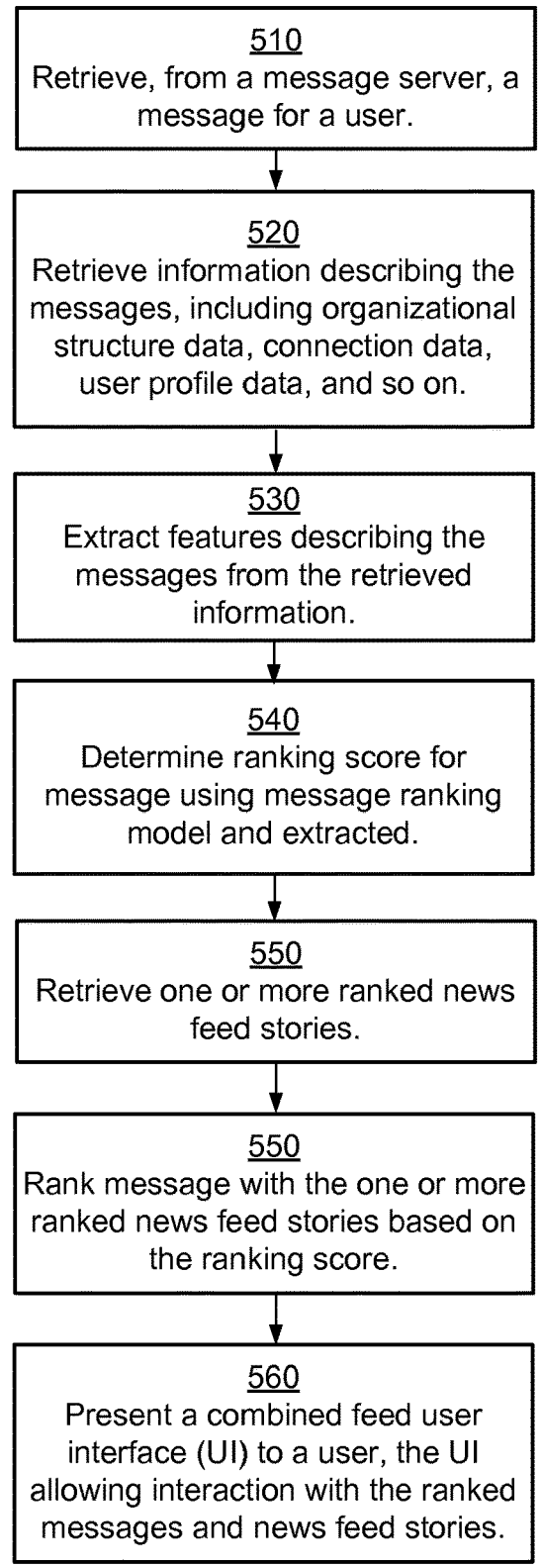
FIG. 5 shows a flowchart illustrating a method of ranking and presenting a message, such as an email, with news feed stories, by an online system, according to an embodiment of the invention.

FIG. 5 shows a data flow diagram illustrating a method of ranking and presenting a message 140, such as an email, with news feed stories, by an online system 100, according to an embodiment of the invention. The online system 100 first retrieves 510 a message 140 (or messages) from a message server, such as message server 170. In one embodiment, the messages 140 may be received by the online system 100 automatically from the message server 170. The online system 100 retrieves 520 information describing the messages 140, such as the organizational structures data 150, user actions 130, user profile objects 125, connection objects 120, and so on. The online system 100 extracts 530 features describing the message 140 from the retrieved information. These features comprise the feature data for the message 140 and may be extracted by the feature extraction module 330 and stored in the feature data store 310.

Using the message ranking module 350, the online system 100 determines 540 a ranking score for the retrieved message 140 (or messages) based on the extracted features. This ranking may be performed by the message scoring module 360. In one embodiment, the online system 100 also determines the users of the online system other than the sender and recipients of the message who may access the message 140 (e.g., via the message access control module 370), and associates this information with the message 140.

The online system 100 retrieves 550 one or more ranked news feed stories 135 for a user. These news feed stories 135 represent actions, content, and other items of interest to a user as described above. These news feed stories 135 have already been ranked according to a separate and/or similar ranking method as described above. In one embodiment, the news feed stories are ranked by the news feed manager 155 and are stored in the news feed store 250.

The online system 100 ranks 560 the set of messages 140 and news feed stories based on the ranking score for each message 140 and news feed story 135. The online system 100 determines the ranking score of each message 140 and news feed story and uses the ranking score to order the set of messages and news feed stories. After ranking the message(s) and news feed stories 135, the online system 100 presents 570 the ranked list of the message(s) and news feed stories in a combined feed user interface (UI) to the user associated with the message(s) and news feed stories. The UI allows the user to interact with the presented ranked messages 140 and news feed stories 135. The UI allows users to perform interactions with email messages that are typically used for news feed stories, for example, liking or commenting on the email messages. Furthermore, the online system 100 also associates the users indicated in the message 140 with users of the online system 100, such that instead of simply presenting the mailing address of the user in the combined feed, the online system 100 presents an indication of the user's online system user identifier such as a profile picture. In one embodiment, the retrieving 550, ranking 560, and presenting 570 are be performed by the presentation module 290.

Exemplary User Interfaces for Presenting Ranked Messages in a Combined Feed

Figure 6:
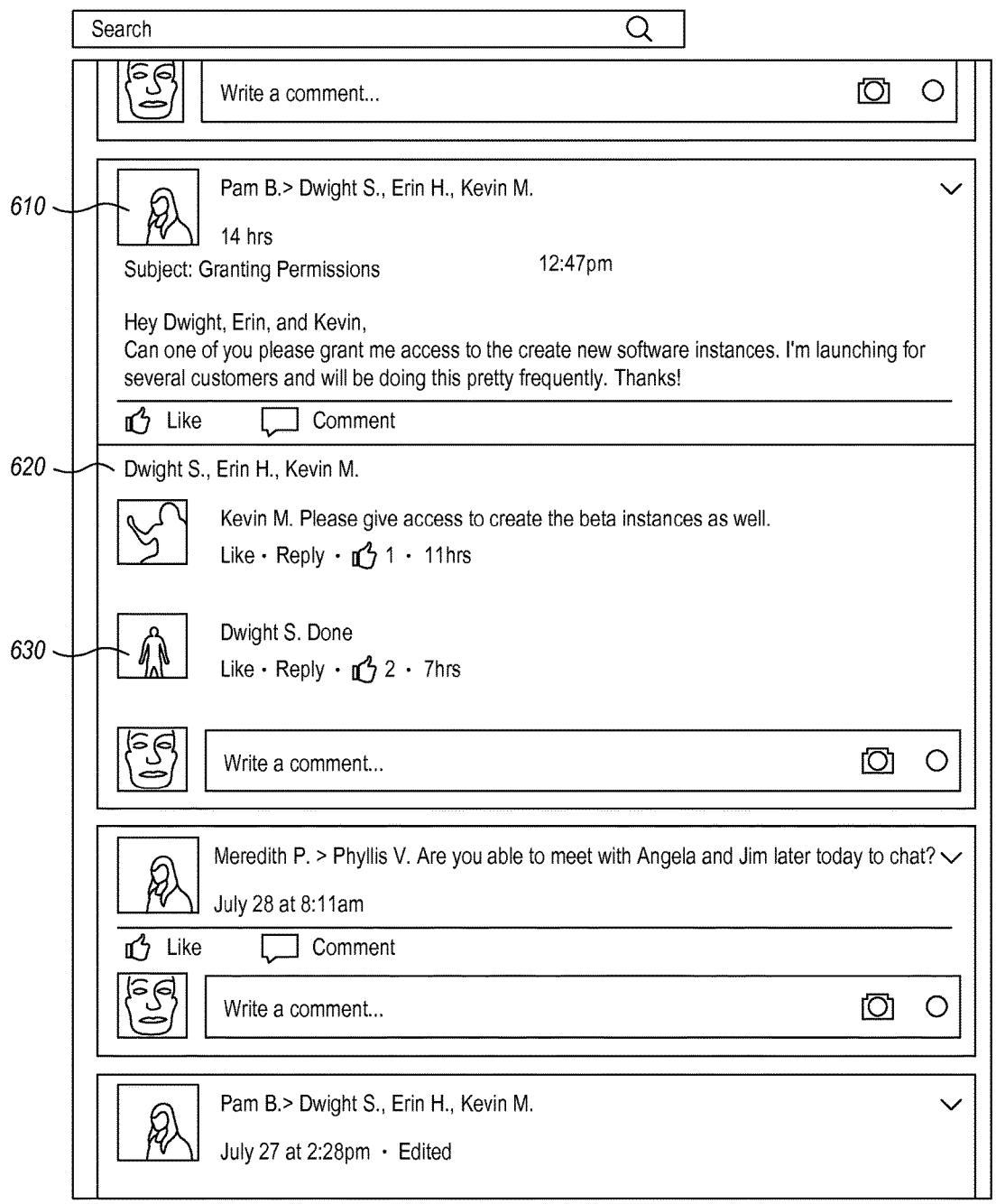
FIG. 6 illustrates an exemplary user interface for displaying ranked messages and news feed stories in a combined feed.

FIG. 6 illustrates an exemplary user interface for displaying ranked messages and news feed stories in a combined feed display. Combined feed entry 610 (or item 610) represents a message 140 addressed to the user that has been presented with the combined feed display 112. In the exemplary user interface of FIG. 6, the combined feed entry 610 indicates a sender to the left of an arrow indicator (the triangle), and multiple recipients to the right of the arrow indicator. However, in other embodiments, the sender and recipients may be indicated in a different format (e.g, with sender on one row and recipients on a second row). Below the sender and recipient is an area containing the body of the message 140. In some cases, this area also indicates a subject of the message 140, and includes links to attachments of the message 140.

UI element 620, placed below the combined feed entry 610, is a section indicating actions performed by other users who are authorized to receive the combined feed entry 610. Here, multiple users have "liked" the message 140 indicated in the combined feed entry 610. UI element 630 includes responses to the message 140 indicated in combined feed entry 610. These responses may be seen by users with access rights as determined by the online system 100.

Additional messages 140 and news feed stories, ordered according to their respective ranking scores, may follow the combined feed item 610 as additional combined feed items.

Figure 7:
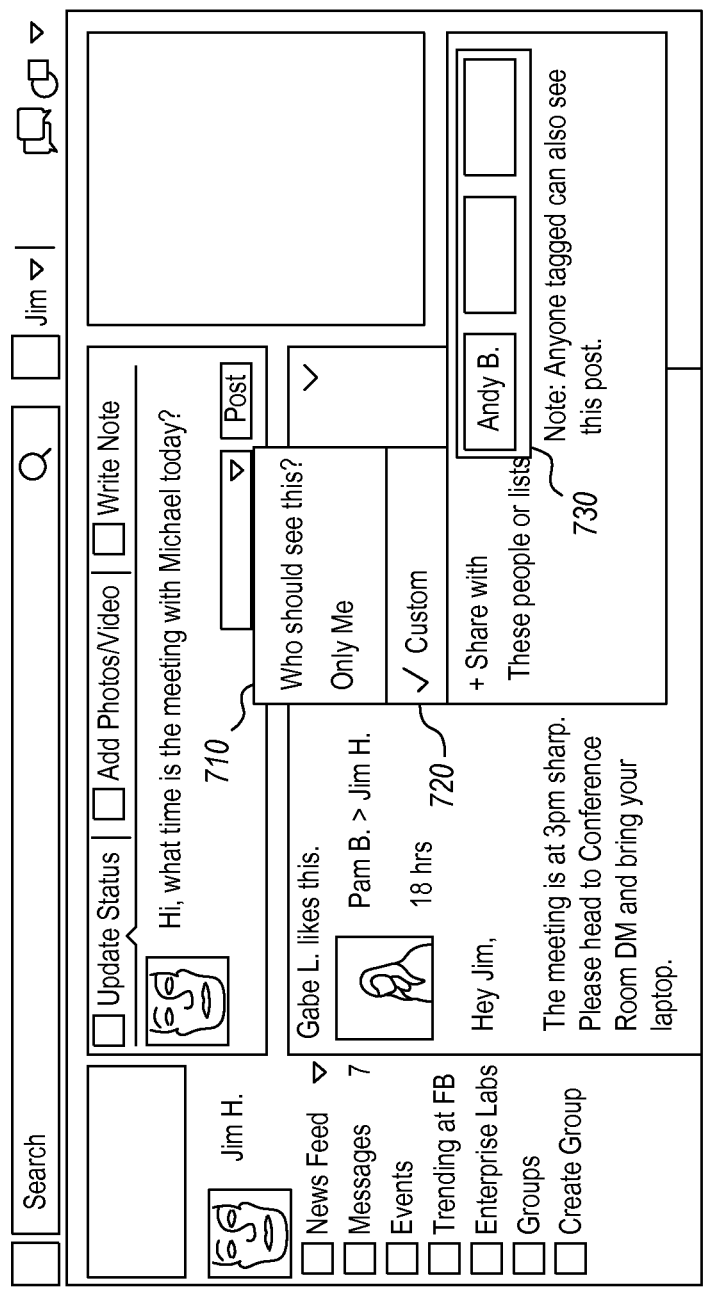
FIG. 7 illustrates an exemplary user interface for controlling the access rights for ranked messages.

FIG. 7 illustrates an exemplary user interface for controlling the access rights of users for interacting with the ranked messages 140. Upon interacting with (e.g., by clicking or tapping) on UI element 710 associated with a message 140 that has been presented to the user as a combined feed item, the online system 100 presents a context menu UI element 720 to the user, allowing the user to select a custom set of users with which to share the message 140. The online system 100 receives the indication of these users in the selection box 730. Once the online system 100 receives the indication of these additional users to share the message 140 with, the online system 100 provides these additional users with rights to view the message 140, and the message 140 is presented to these additional users on their respective combined feed UIs. The message 140 is ranked accordingly on each combined feed UI that it is presented in.

Exemplary Horizontal Scroll Module

Figure 8:
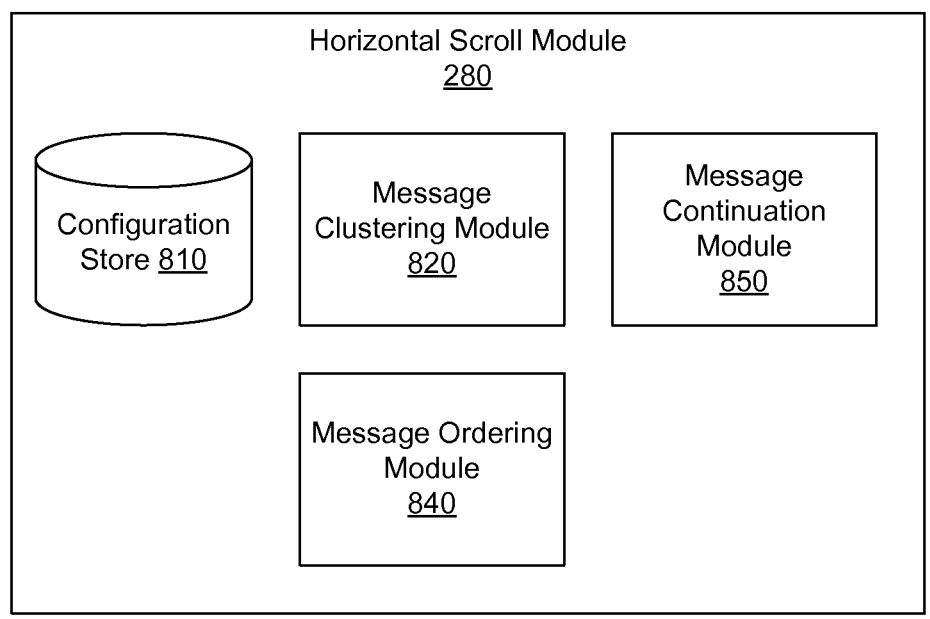
FIG. 8 is a block diagram illustrating a horizontal scroll module of FIG. 2 according to one embodiment.

FIG. 8 is a block diagram illustrating a horizontal scroll module 280 of FIG. 2 according to one embodiment. The horizontal scroll module 280 of FIG. 8 includes a configuration store 810, message clustering module 820, message ordering module 840, and message continuation module 850. In other embodiments, the horizontal scroll module 280 may include additional, fewer, or different modules for various applications. Conventional components such as network interfaces, security mechanisms, load balancers, failover servers, management and network operations consoles, and the like are not shown so as to not obscure the details of the system.

The message clustering module 820 selects related messages 140 for presentation in a horizontal scroll user interface. In an embodiment, the message integration module 160 identifies a set of combined feed items, ranks the set of combined feed items based on a ranking score of each item, and sends them for presentation to the user. The user interface manager 190 receives a vertical scroll input that allows the user to scroll through the set of combined feed items in order of the ranking based on the ranking score. The message clustering module 820 selects a subset of the set of combined feed items selected for presentation to the user in response to a horizontal scroll input. In other embodiment, online system 100 allows the user to scroll through a set of messages via a vertical scroll input. The message clustering module 820 selects a subset of the set of messages comprising related messages in response to a horizontal scroll input. The subset of feed items or related messages 140 is shown together in a horizontal scroll user interface rather than a vertically scrolling combined feed as shown for the combined feed items above. Instead of scrolling vertically down a list of messages 140, a user is able to instead scroll horizontally through a set of related messages 140. Messages may be related based on a variety of factors. The message clustering module 820 marks messages 140 as related based on one or more of these factors. The message clustering module 820 identifies the related messages presented via horizontal scroll input as a subset of the set of messages that were identified for presenting via the vertical scroll input. Accordingly, the user would be able to reach each of the related messages presented via the horizontal scroll input by performing a vertical scroll, although the user would have to scroll through a larger set of messages including several unrelated messages in order to reach the same set of related messages.

The horizontal scroll module 280 may receive a horizontal scroll operation associated with a selected news feed item. In response, the horizontal scroll module 280 identifies a subset of the combined feed items for presenting to the user in response to subsequent horizontal inputs. As an example, if the horizontal scroll input is associated with a news feed item describing a connection of the user, the horizontal scroll module 280 identifies a subset of the combined feed items including other news feed stories describing the connection of the user. As another example, if the horizontal scroll input is associated with a news feed item describing a photo posted on the online system, the horizontal scroll module 280 identifies a subset of the combined feed items including other news feed stories describing the photo. As another example, if the horizontal scroll input is associated with a news feed item associated with a group represented in the online system, the horizontal scroll module 280 identifies a subset of the combined feed items including other news feed stories associated with the group. As another example, if the horizontal scroll input is associated with a news feed item associated with an event represented in the online system, the horizontal scroll module 280 identifies a subset of the combined feed items including other news feed stories associated with the event.

In one embodiment, the message clustering module 820 marks messages 140 as related when the messages 140 share the same sender and/or recipients, or share a threshold number of recipients. In one embodiment, the message clustering module 820 marks messages 140 as related when the messages 140 are all received within a certain period of time.

In one embodiment, the message clustering module 820 marks messages 140 as related when the messages 140 comprise content describing the same topic. The message clustering module 820 performs a topic analysis, similar to that described above for the message ranking module 270, and determines a subset of related messages 140 that describe the same topic.

In one embodiment, the message clustering module 820 marks messages 140 as related when the messages 140 are part of a chain or thread of messages 140. A chain of messages 140 are messages 140 that are replies and/or forwards of each other. For example, when the message 140 is an email, a reply message 140 typically includes the original message 140 within the reply message 140 and also includes a modified subject heading (e.g., prefixed by "RE:"). These messages 140 are likely about the same conversation and the message clustering module 820 groups these together.

In one embodiment, the message clustering module 820 marks messages 140 as related if the messages 140 have the same or similar subject line or content. Messages 140 with the same subject line or content may likely be about a similar issue, and so are likely to be related. As noted above, an edit distance algorithm or other method may be used to determine how similar two messages 140 are, and two messages 140 may be determined to have a similar subject line when the edit distance algorithm indicates a match beyond a threshold measure.

In one embodiment, the message clustering module 820 marks messages 140 as related when the messages 140 have users that share affinities with each other. For example, a message 140 sent by a manager may be related to a message 140 sent by an employee reporting to that manager based on the affinity between these two users. The affinity between two users may be determined by the message clustering module 820 based on user actions 130 between two users or based on the organizational structures data 150.

The message clustering module 820 may use the feature data extracted for the messages 140 to determine the relationship between the messages 140, instead of directly analyzing the messages 140, as the feature data may already include information regarding the topic, content, and user relationships for the messages 140.

The message ordering module 840 orders the set of related messages 140 selected by the message clustering module 820. The messages 140 may be ordered based on one or more factors, including 1) based on the ranking score for each message 140 that was calculated by the message ranking module 270; 2) the timestamp of each message 140; 3) the size of each message 140; 4) the number of recipients of each message 140; and 5) how similar each message 140 is based on content, recipients, sender, topic, etc.

Additionally, the message ordering module 840 may provide more than one ordering of messages 140. In one embodiment, the online system 100 allows for a user interface 110 that includes a horizontal scroll action in either a left or right direction. In such a case, the message ordering module 840 provides a ordering of messages 140 for either direction, each ordering based on separate factors. For example, the message ordering module 840 may provide an ordering based on timestamp for one scroll direction, and an ordering based on the ranking score for the other scroll direction. As another example, the message ordering module 840 may provide an ordering of lower ranked messages 140 in one scroll direction, and an ordering based on the higher ranked messages 140 for the other scroll direction.

In one embodiment, the message continuation module 850 determines a message 140 in the combined feed display 112 to display as the next vertically scrolled item once a user has performed a horizontal scroll input on a message 140. In one embodiment, the message continuation module 850 determines that the next message 140 to be presented in the combined feed display 112 after the set of related message 140 presented via the horizontal scroll input is a message 140 with a ranking score that is lower than the message 140 that is presented to the user in the set of related messages. For example, during presentation, when the user performs the horizontal scroll input, the message continuation module 850 determines the next message 140 to be shown, and the user interface manager 190 causes the next message 140 to be shown in the combined feed display 112, hiding any intervening messages 140 that were originally to be presented before the next message 140 based on the ranking. In another embodiment, the message continuation module 850 determines that the next message 140 to be presented does not change from the original ranking of messages in the combined feed display 112.

The configuration store 810 stores a default or user-provided configuration for the horizontal scroll function. The configuration store 810 stores for each user whether the horizontal scroll feature should be enabled. For those users with the horizontal scroll feature enabled, the configuration store 810 stores the default factor that should be used for each user regarding which factor(s) to use when determining (i.e., clustering) related messages 140 and which factor(s) to use when ordering messages 140. The configuration store 810 may also store an option regarding which message the user wishes to see in the combined feed display 112 after performing a horizontal scroll input. The user may be presented with various options to change the factors that are used, upon which the configuration store 810 is updated. The configuration store 810 provides the message clustering module 820 and the message ordering module 840 with the configuration settings to use when ordering and clustering messages 140.

Exemplary Process for Clustering and Ordering Messages for Horizontal Scroll

Figure 9:
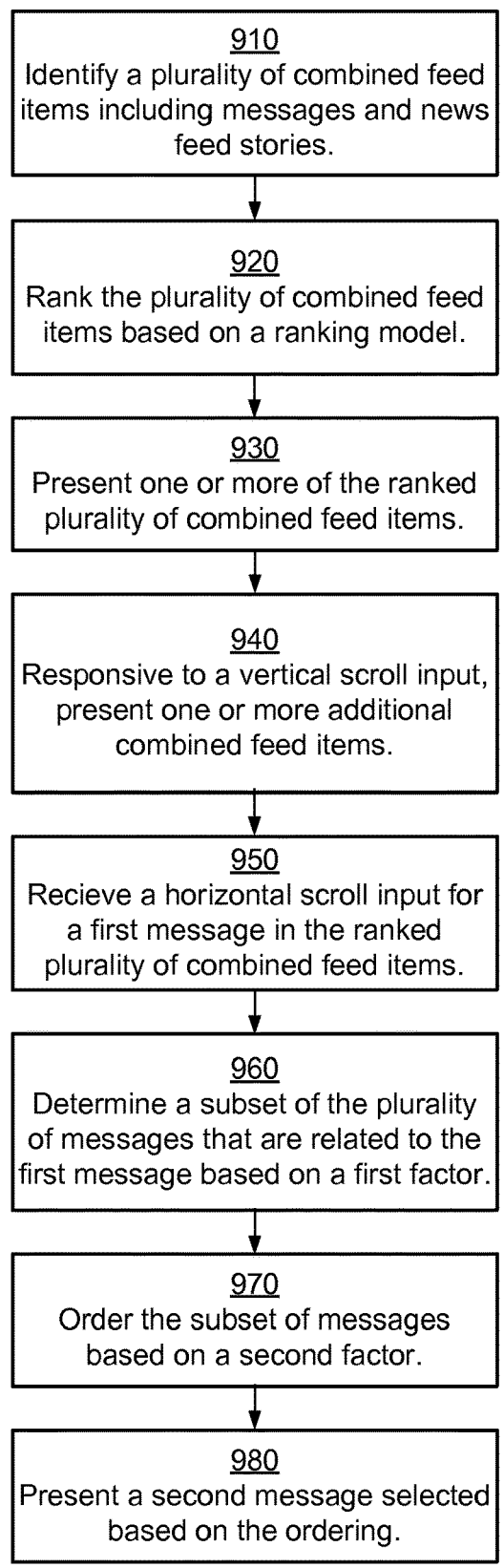
FIG. 9 shows a data flow diagram illustrating a method of clustering and organizing a set of related messages and presenting those messages in a feed using horizontal scroll, according to an embodiment of the invention.

FIG. 9 shows a flowchart illustrating a method of clustering and organizing a set of related messages 140 and presenting those messages 140 in a feed using horizontal scroll, according to an embodiment of the invention. The online system 100 identifies 910 a plurality of combined feed items 165, including messages 140 and news feed stories 135. As noted above, in one embodiment, messages 140 may be emails received from an email server. The online system 100 ranks 920 these combined feed items 165 based on a ranking model. As noted above, the messages 140 may be ranked using a message ranking model 350 in the message ranking module 270, and the news feed items may be ranked using the news feed manager 155. The online system 100 presents 930 one or more of these ranked plurality of combined feed items 165 to the user in a user interface. As noted above, the combined feed items 165 may be ranked by the presentation module 290, and presented to the user at a user interface 110 by the user interface manager 190.

In response to a vertical scroll input at the user interface, the online system 100 presents 940 additional combined feed items 165 to the user via the user interface. In one embodiment, these additional items have already been sent by the online system 100 to the user's client device. In another embodiment, the online system 100 sends the additional items to the user's client device upon receiving the vertical scroll input from the user interface of the client device.

In some cases, the online system 100 receives 950 a horizontal scroll input for a first message 140 in the ranked plurality of combined feed items. The online system 100 determines 960 a subset of the plurality of messages that are related to the first message 140 based on a first factor (i.e., criteria). The messages may be selected by the message clustering module 820, and as noted above, this factor may be that the messages have the same sender, or the same topic, and so on. The online system 100 also orders 970 the subset of messages based on a second factor. The messages may be ordered by the message ordering module 840, and as noted above, the second factor may order the messages based on timestamp, ranking score, and so on. The online system 100 may have performed this determination and ordering for one or more messages prior to presenting the combined feed to the user, or may perform this determination and ordering for a message 140 upon receiving a horizontal scroll input indicated for that message 140.

The online system 100 (via the user interface) presents 980 a second message 140 from the subset of messages that is selected based on the ordering. Upon receiving additional horizontal scroll inputs, the online system 100 presents additional messages that are selected based on the ordering. This allows the system to present related messages to the user without the user having to scroll vertically through the combined feed.

As an example, the online system 100 presents the messages 140 in the combined feed display 112 to the user. The combined feed display displays items vertically, such that a user should scroll vertically through the displayed items to display additional items. The user interacts with the user interface 110 provided by the online system 100 to perform a vertical scroll input. This causes the user interface 110 to display additional combined feed items. At another point, the user interacts with the user interface 110 to perform a horizontal scroll input. The online system 100 receives this horizontal scroll input for a particular message 140, and determines the related messages 140 for this particular message 140 as those messages 140 with the same sender and recipient. The online system also orders these related messages 140 according to the ranking score as previously determined by the online system 100. The online system 100 presents these related messages 140 according to the determined order to the user as the user performs horizontal scroll inputs. Thus, a first horizontal scroll input may show the first related message, and a second horizontal scroll input may show a second related message, and so on.

Exemplary User Interface for Horizontally Scrolled Messages

Figure 10:
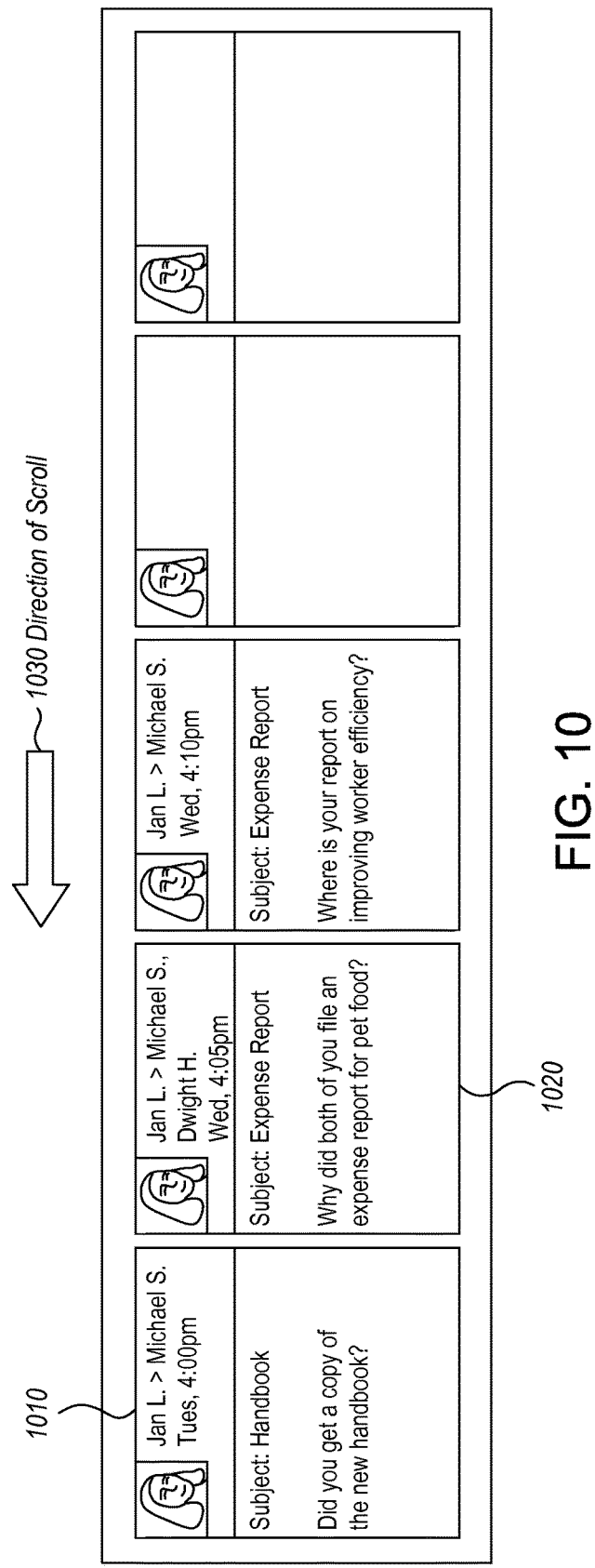
FIG. 10 illustrates an exemplary user interface for horizontally scrolling related messages.

FIG. 10 illustrates an exemplary user interface for horizontally scrolling related messages 140. An initial message element 1010 is presented to the user in the combined feed display 112. Upon a horizontal scroll input according to the direction scroll 1030, the online system 100, via the user interface 110, displays additional message elements, such as message element 1020, to the user. These additional message elements have messages that are related to the message in the initial message element 1010 based on a first factor, and are ordered according to a second factor, as described above. As one of the additional message elements are presented at a location adjacent to the combined feed (e.g., centrally), other additional message elements that are too far in displayed distance from the presented additional message element are hidden and not presented.

In one embodiment, the user is also able to provide a horizontal scroll input according to a direction of scroll opposite the direction of scroll 1030 indicated in the FIG. 10.

When an opposite direction of scroll is received, the online system 100 presents to the user message elements in a reverse order until the initial message element 1010 is again presented to the user. The online system 100 may further receive a horizontal scroll input in a direction of scroll opposite the direction of scroll 1030 even after the initial message element 1010 is presented. In such a case, the online system 100 may remove the initial message element 1010 from presentation, and may delete the associated message from the local message store. The online system 100 may alternatively display a second ordered list of related messages as the user continues to provide horizontal scroll inputs in the direction opposite the direction of scroll 1030. This second ordered list of related messages may be selected and ordered based on different factors from the first. For example, the second ordered list may be selected based on similarity of content, and ordered based on timestamp.

In an embodiment, the horizontal scroll module 280 determines a different subset of the set of messages identified for presenting via vertical scroll based on an angle of the horizontal scroll input. Accordingly, a first subset determined based on a first criteria of the set of messages is presented if the user performs a horizontal scroll to the right, a second subset determined based on a second criteria is presented to the user if the user performs a horizontal scroll in an upward diagonal direction pointing upwards and to the right, and a third subset determined based on a third criteria is presented to the user if the user performs a horizontal scroll in a downward diagonal direction pointing downwards and to the right. For example, if the horizontal scroll module 280 receives a input performing horizontal scroll to the right, the horizontal scroll module 280 presents messages from the same user; if the horizontal scroll module 280 receives a input performing horizontal scroll in the upward diagonal direction, the horizontal scroll module 280 presents related messages from the same thread of messages; and, if the horizontal scroll module 280 receives a input performing horizontal scroll in the downward diagonal direction, the horizontal scroll module 280 presents related messages on the same topic as the current messages. Each subset of related messages may be ranked based on the significance each message. In an embodiment, the online system allows a user to configure the behavior of horizontal scroll in each direction.

In an embodiment, the roles of the horizontal scroll and the vertical scroll are interchanged. Accordingly, the online system 100 presents the selected set of combined feed to the user in response to a horizontal scroll input. However, if the user provides a vertical scroll input the online system 100 presents a subset of the combined feed for presenting to the user. The subset of the combined feed depends on certain pre-determined criteria associated with the vertical scroll input that may be configurable.

In general, the online system 100 selects a set of combined feed for the user and presents the selected set of combined feed in response to receiving a scroll input in a first direction. The online system 100 selects a subset of the set of combined feed for the user in response to receiving a scroll input in a second direction distinct from the first direction. The subset is selected based on certain pre-determined criteria associated with the scroll input in the second direction that may be configurable. In an embodiment, the first direction is vertical and the second direction is horizontal. In another embodiment, the first direction is horizontal and the second direction vertical.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method comprising:
storing, by an online system, a plurality of user profiles of users associated with an organization;

receiving, by the online system, interactions associated with the organization for the plurality of users, the interactions performed by the plurality of users;

generating a plurality of news feed stories for a user based on the received interactions associated with the organization that are associated with the user;

receiving, by the online system, a plurality of electronic mails (emails) for the user, each email having a sender and one or more recipients;

for each of the plurality of emails, determining a ranking score indicative of a significance of the email for the user, the ranking score generated using a message ranking module, the message ranking model receiving as input one or more features, the one or more features including a rate of interaction of the user with one or more of the sender or the recipients of the email, the rate of interaction indicating a number of actions performed by the user within the online system per period of time with one or more of the sender or the recipients of the email, and the message ranking model outputting the ranking score;

for each of the plurality of news feed stories, determining a ranking score for the newsfeed story;

selecting for the user a plurality of combined feed items for a combined feed, wherein the plurality of combined feed items comprise at least an email and a news feed story, each combined feed item of the plurality of combined feed items ranked in the plurality of combined feed items according to the ranking score of each combined feed item; and transmitting, by the online system, the ranked plurality of combined feed items to a client device of the user for presentation to the user within a combined feed user interface.

2. The method of claim 1, wherein the ranked plurality of combined feed items ranks the plurality of emails in an order distinct from a chronological order.

3. The method of claim 1, wherein the ranked plurality of combined feed items are presented to the user via a user interface that allows the user to perform a like operation with an email, the like operation indicating the user likes the email.

4. The method of claim 1, wherein the ranked plurality of combined feed items are presented to the user via a user interface that allows the user to comment on an email.

5. The method of claim 1, wherein the ranked plurality of combined feed items are presented to the user via a user interface that allows the user to share an email of the plurality of emails with one or more other users that are not indicated as sender of recipients of that email.

6. The method of claim 5, wherein the one or more users with whom the email is shared are allowed to perform a set of interactions distinct from the set of interactions performed by the other users who are indicated as recipients of the email.

7. The method of claim 6, wherein the set of interactions include posting a comment to the email but exclude replying to the email.

8. The method of claim 6, wherein the set of interactions include indicating a like to the email but exclude replying to the email.

9. The method of claim 1, wherein the one or more features includes the number of recipients of the email.

10. The method of claim 1, wherein the one or more features includes a measure of recency of the email.

11. The method of claim 1, wherein the one or more features includes a rate of interaction of the user with other emails similar to the email, the similarity of two emails measured based on the number of elements of the two emails that match each other.

12. The method of claim 1, wherein the one or more features includes the relationship of the user to the other users indicated as the sender or recipients in the email.

13. The method of claim 12, wherein the relationship between the user with the sender of the email is a supervisee-supervisor relationship as defined in an organizational structure of the organization.

14. The method of claim 1, further comprising:
receiving the emails from an external email server.

15. A non-transitory computer-readable storage medium storing instructions, that when executed by a processor, cause the processor to execute operations comprising:

storing, by an online system, a plurality of user profiles of users associated with an organization;

receiving, by the online system, interactions associated with the organization for the plurality of users, the interactions performed by the plurality of users;

generating a plurality of news feed stories for a user based on the received interactions associated with the organization that are associated with the user;

receiving, by the online system, a plurality of electronic mails (emails) for the user, each email having a sender and one or more recipients;

for each of the plurality of emails, determining a ranking score indicative of a significance of the email for the user, the ranking score generated using a message ranking module, the message ranking model receiving as input one or more features, the one or more features including a rate of interaction of the user with one or more of the sender or the recipients of the email, the rate of interaction indicating a number of actions performed by the user within the online system per period of time with one or more of the sender or the recipients of the email, and the message ranking model outputting the ranking score;

for each of the plurality of news feed stories, determining a ranking score for the newsfeed story;

selecting for the user a plurality of combined feed items for a combined feed, wherein the plurality of combined feed items comprise at least an email and a news feed story, each combined feed item of the plurality of combined feed items ranked in the plurality of combined feed items according to the ranking score of each combined feed item; and transmitting, by the online system, the ranked plurality of combined feed items to a client device of the user for presentation to the user within a combined feed user interface.

16. The non-transitory computer-readable storage medium of claim 15, wherein the ranked plurality of combined feed items ranks the plurality of emails in an order distinct from a chronological order.

17. The non-transitory computer-readable storage medium of claim 15, wherein the ranked plurality of combined feed items are presented to the user via a user interface that allows the user to share an email of the plurality of emails with one or more other users that are not indicated as sender of recipients of that email.

18. The non-transitory computer-readable storage medium of claim 15, wherein the ranked plurality of combined feed items are presented to the user via a user interface that allows the user to share an email of the plurality of emails with one or more other users that are not indicated as sender of recipients of that email wherein the one or more users with whom the email is shared are allowed to perform a set of interactions distinct from the set of interactions performed by the other users who are indicated as recipients of the email.

19. The non-transitory computer-readable storage medium of claim 15, wherein the one or more features includes the number of recipients of the email.

20. The non-transitory computer-readable storage medium of claim 15, wherein the one or more features includes a measure of recency of the email.

21. The non-transitory computer-readable storage medium of claim 15, wherein the one or more features includes a rate of interaction of the user with other emails similar to the email, the similarity of two emails measured based on the number of elements of the two emails that match each other.

22. The non-transitory computer-readable storage medium of claim 15, wherein the one or more features includes the relationship of the user to the other users indicated as the sender or recipients in the email.

\* \* \* \* \*